D. R. MOORE.
Stove-Pipe Shelves, &c.
No. 140,939. Patented July 15, 1873.
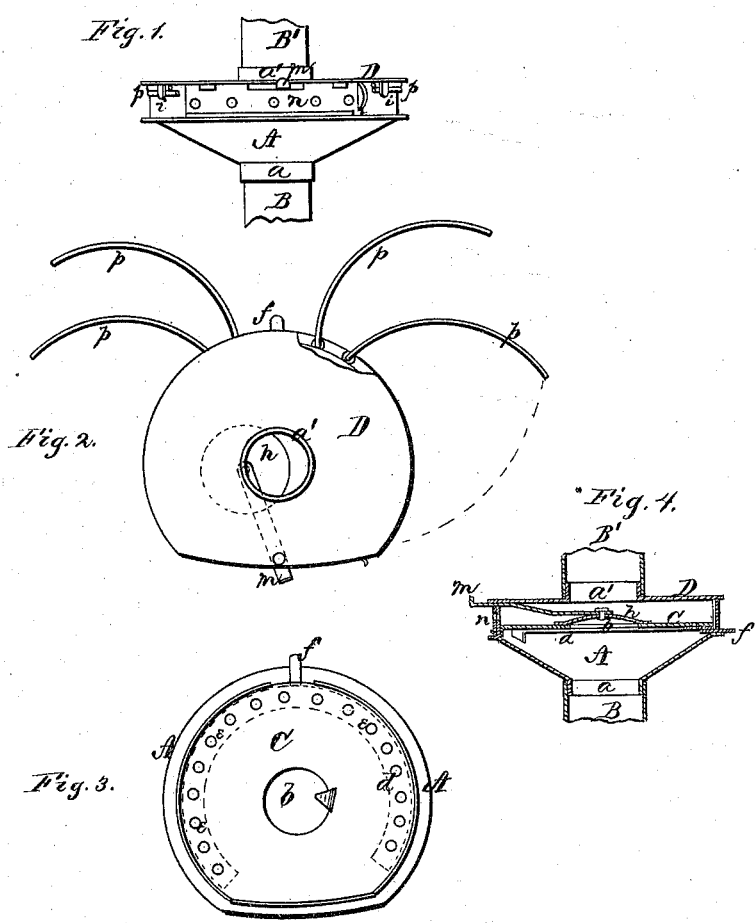
Witnesses:
Henry N. Miller
Inventor.
David R. Moore
per Alexander Mason
Attorneys.

UNITED STATES PATENT OFFICE.

DAVID R. MOORE, OF OWEGO, NEW YORK.

IMPROVEMENT IN STOVE-PIPE SHELVES, &c.

Specification forming part of Letters Patent No. 140,939, dated July 15, 1873; application filed May 7, 1873.

*To all whom it may concern:*

Be it known that I, DAVID R. MOORE, of Owego, in the county of Tioga and in the State of New York, have invented certain new and useful Improvements in Combined Stove-Pipe Shelf, Damper, and Clothes-Drier; and do hereby declare that the following is a full, clear, and exact description thereof, reference being had to the accompanying drawings and to the letters of reference marked thereon making a part of this specification.

The nature of my invention consists in the construction and arrangement of a stove-pipe shelf, with damper and clothes-drier, as will be hereinafter more fully set forth.

In order to enable others skilled in the art to which my invention appertains to make and use the same, I will now proceed to describe its construction and operation, referring to the annexed drawing, in which—

Figure 1 is a side view, and Fig. 2 a plan view, of my invention. Fig. 3 is a plan view with the top plate removed; and Fig. 4 is a longitudinal vertical section of the same.

A represents a pan, of any suitable dimensions, the bottom of which is conical, as shown in Figs. 1 and 4, and has a central aperture with collar $a$, to fit over the end of one length of stove-pipe, B. In this pan A is placed a plate, C, having a central aperture, $b$, and a series of perforations, $e\ e$, around and near its edge, as shown in Fig. 3. Below these perforations in the plate C is a damper, $d$, operated by means of a handle, $f$, so as to open and close said perforations at will. The aperture $b$ is also provided with a damper, $h$, operated by means of a pivoted lever or handle, $m$. The pan A is covered by a flat plate, D, also provided with central aperture and collar $a'$, over which fits another length, B', of stove-pipe. The front of the pan A is cut away, as shown in Fig. 2, and this front part is perforated and provided with a sliding damper, $n$, to open and close the perforations, as desired.

This stove-pipe shelf, being constructed as described, and elevated a certain distance above the stove, all the gases and smoke will pass into the pan when the sliding damper $n$ is opened, and thus do away with the annoyance of the same in the room.

The upper or top plate D is heated either by direct or indirect draft, according to the amount of heat desired.

The direct draft is obtained by opening the damper $h$ and closing the damper $d$. The smoke and heat then pass direct from the pipe B through the aperture $b$ in the plate C and into the pipe B'.

The indirect draft is obtained by opening the damper $d$ and closing the damper $h$, when the smoke and heat coming from the pipe B will spread under the plate C, pass up through the perforations $e\ e$ near the edge of the same, and, heating the plate D more thoroughly, pass out through the pipe B'.

On each side of the pan A are hinged one, two, or more arms, $p\ p$, which, when not in use, are held close to the pan by catches $i\ i$, but when desired for use are released from said catches and thrown out for hanging clothes and other articles for drying.

Having thus fully described my invention, what I claim as new, and desire to secure by Letters Patent, is—

1. The combination of the perforated pan A with collar $a$ and sliding damper $n$, plate D with collar $a'$, and plate C with opening $b$ and damper $h$, all substantially as and for the purposes set forth.

2. The combination of the pan A, the arms $p\ p$, and catches $i\ i$, all substantially as set forth.

In testimony that I claim the foregoing I have hereunto set my hand this 2d day of April, 1873.

DAVID R. MOORE.

Witnesses:
C. L. EVERT,
D. H. BLOODGOOD.